United States Patent
Huang et al.

(10) Patent No.: US 12,287,431 B1
(45) Date of Patent: Apr. 29, 2025

(54) LiDAR AND MOBILE DEVICE

(71) Applicant: SUTENG INNOVATION TECHNOLOGY CO., LTD., Shenzhen (CN)

(72) Inventors: Maonan Huang, Shenzhen (CN); Simei Li, Shenzhen (CN); Hao Wu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/914,028

(22) Filed: Oct. 11, 2024

(30) Foreign Application Priority Data

Dec. 28, 2023 (CN) .......................... 202311829386.2

(51) Int. Cl.
*G01S 7/48* (2006.01)
*G01S 7/481* (2006.01)
*G01S 17/931* (2020.01)

(52) U.S. Cl.
CPC .......... *G01S 7/4817* (2013.01); *G01S 7/4815* (2013.01); *G01S 17/931* (2020.01)

(58) Field of Classification Search
USPC ...................................................... 356/4.01
See application file for complete search history.

(56) References Cited

U.S. PATENT DOCUMENTS

| | | | |
|---|---|---|---|
| 2018/0364334 A1* | 12/2018 | Xiang | G01S 17/42 |
| 2019/0097722 A1* | 3/2019 | McLaurin | H01S 5/34333 |
| 2022/0291350 A1* | 9/2022 | Li | G01S 17/931 |
| 2023/0050177 A1* | 2/2023 | Grieder | H01S 5/0087 |
| 2023/0204783 A1* | 6/2023 | Pan | G01S 17/894 |
| | | | 356/4.01 |
| 2024/0045031 A1* | 2/2024 | Li | G01S 7/4811 |

* cited by examiner

*Primary Examiner* — James R Hulka
(74) *Attorney, Agent, or Firm* — BAYES PLLC

(57) ABSTRACT

A LiDAR and a movable device are disclosed. The LiDAR includes a first optical transceiving module, a first reflecting module, and a galvanometer module. The galvanometer module includes a galvanometer and a first driving mechanism. The galvanometer is configured to receive a detection light emitted from the first reflecting mirror of the first reflecting module, and scan a target object. The first driving mechanism is connected to the galvanometer, and the first driving mechanism is configured to drive the galvanometer to move between a first preset position and a second preset position.

8 Claims, 10 Drawing Sheets

LiDAR AND MOBILE DEVICE

CROSS-REFERENCE TO RELATED APPLICATION

The present application claims the benefit of priority to Chinese Patent Application No. 202311829386.2, filed on Dec. 28, 2023, which is hereby incorporated by reference in its entirety.

TECHNICAL FIELD

The present application relates to the field of LiDAR technology, and in particular to a LiDAR and a movable device.

TECHNICAL BACKGROUND

LiDAR has been widely used in fields such as autonomous driving, assisted driving, and other mobile equipment due to its excellent detection characteristics and strong adaptability to external environments. The driving scenes of mobile equipment are complex and changeable during actual driving. However, because the field of view of a LiDAR is fixed, certain desired detection areas may fall into the blind spots of the LiDAR in some driving scenes.

SUMMARY

Embodiments of the present application provide a LiDAR and a movable device, which can improve the current situation where the LiDAR is difficult to cope with complex and changeable driving scenes because the field of view range remains unchanged.

In a first aspect, an embodiment of the present application provides a LiDAR, which includes a first optical transceiving module, a first reflecting module, and a galvanometer module.

The first optical transceiving module is configured to emit detection light; the first reflecting module includes a first reflecting mirror arranged corresponding to the first optical transceiving module, and the first reflecting mirror is configured to reflect the detection light emitted by the first optical transceiving module to the galvanometer module; the galvanometer module includes a galvanometer and a first driving mechanism, the galvanometer is configured to receive the detection light emitted by the first reflecting mirror, the first driving mechanism is connected to the galvanometer, and the first driving mechanism is configured to drive the galvanometer to move between a first preset position and a second preset position; the first optical transceiving module and the first reflecting module are configured so that when the galvanometer is located at the first preset position or the second preset position, the detection light emitted by the first optical transceiving module can be reflected to the galvanometer via the first reflecting mirror.

In some embodiments, the first reflecting module includes a second driving mechanism, which is connected to the first reflecting mirror and is configured to drive the first reflecting mirror to rotate between a first angle position and a second angle position; at the first angle position, the first reflecting mirror is configured to reflect the detection light to the galvanometer located at a first preset position; at the second angle position, the first reflecting mirror is configured to reflect the detection light to the galvanometer located at a second preset position.

In some embodiments, each of the first optical transceiving modules includes a first laser and a second laser, and a detection light emitted by the first laser and a detection light emitted by the second laser are set at a preset angle; the first laser is configured to emit the detection light when the galvanometer is located at the first preset position, so that the detection light is reflected via the first reflecting mirror to the galvanometer located at the first preset position; the second laser is configured to emit the detection light when the galvanometer is located at the second preset position, so that the detection light is reflected via the first reflecting mirror to the galvanometer located at the second preset position.

In some embodiments, the first driving mechanism is configured to drive the galvanometer to move between a first preset position and a second preset position along the front-to-back direction of the LiDAR, where the front-to-back direction of the LiDAR is a direction determined by an end of the LiDAR emitting detection light and an end of the LiDAR facing away from the emitting detection light.

In some embodiments, the first driving mechanism is configured to drive the galvanometer to move between a first preset position and a second preset position along the left-right direction of the LiDAR, where the front-to-back direction of the LiDAR is a direction determined by an end of the LiDAR emitting detection light and an end of the LiDAR facing away from the emitting detection light, and the left-to-right direction of the LiDAR is a direction parallel to the bottom surface of the LiDAR and perpendicular to the front-to-back direction.

In some embodiments, the LiDAR includes two first optical transceiving modules and two first reflecting modules; along the front-to-back direction of the LiDAR, the first optical transceiving module and the corresponding first reflecting module are respectively located on both sides of the galvanometer module; along the left-right direction of the LiDAR, the two first optical transceiving modules are respectively arranged on both sides of the galvanometer module, and the two first reflecting modules are respectively arranged on both sides of the galvanometer module. The front-to-back direction of the LiDAR is a direction determined by one end of the LiDAR emitting detection light and the end of the LiDAR away from the emitting detection light, and the left-right direction of the LiDAR is a direction parallel to the bottom surface of the LiDAR and perpendicular to the front-to-back direction.

In some embodiments, the LiDAR includes at least one second optical transceiving module and at least one second reflecting module; at least one second optical transceiving module is arranged between two first optical transceiving modules, and is configured to emit detection light and to receive echo light formed by the target object reflecting the detection light; one second reflecting module corresponds to one second optical transceiving module, and the second reflecting module includes a second reflecting mirror arranged corresponding to the optical transceiving module, and the second reflecting mirror is configured to reflect the detection light emitted by the second optical transceiving module to the galvanometer module. Along the left and right direction of the LiDAR, the second reflecting module is located between the two first reflecting modules, and each first reflecting module and each second reflecting module are distributed in an arc shape around the galvanometer module.

In some embodiments, the LiDAR includes three second optical transceiving modules and three second reflecting modules; at least one of the second optical transceiving modules and the corresponding second reflecting module are configured so that when the galvanometer is at the first preset position or the second preset position, the detection light emitted by the first optical transceiving module can be reflected to the galvanometer via the reflector.

In some embodiments, the control module is communicatively connected to the first driving mechanism, and the control module is configured to control the first driving mechanism to drive the galvanometer to move; at least one of the first optical transceiving module and the first reflecting module is communicatively connected to the control module.

In a second aspect, an embodiment of the present application provides a movable device, including a movable main body and the LiDAR as described above, where the LiDAR is mounted on the main body.

The LiDAR provided in the embodiment of the present application includes a first optical transceiving module, a first reflecting module, and a galvanometer module. The galvanometer module includes a galvanometer and a first driving mechanism for driving the galvanometer to move between a first preset position and a second preset position. The first optical transceiving module and the first reflecting module are configured so that when the galvanometer is located at the first preset position or the second preset position, the detection light emitted by the first optical transceiving module can be reflected to the galvanometer via the first reflecting mirror.

The detection field of view of the LiDAR is changed by controlling the position of the galvanometer, such as expanding the detection field of view of the LiDAR and rotating the detection field of view of the LiDAR, thereby meeting a richer range of driving scenarios. The LiDAR provided by the embodiment of the present application can improve the situation where the LiDAR is difficult to cope with complex and changeable driving scenarios because the field of view range remains unchanged.

REFERENCE NUMERALS

10, LiDAR;
100, galvanometer module; 110, galvanometer; 120, first driving mechanism;
200, first optical transceiving module; 210, first laser; 220, second laser;
300, first reflecting module; 310, first reflecting mirror; 320, second driving mechanism;
400, second optical transceiving module; 410, third laser; 420, fourth laser;
500, second reflecting module; 510, second reflecting mirror; 520, third driving mechanism;
20, mobile device; 21, main body.

DETAILED DESCRIPTION

Embodiments of the present application is further described in detail below in conjunction with the accompanying drawings and embodiments.

LiDAR has been widely used in the fields of autonomous driving, assisted driving, and other mobile equipment due to its excellent detection characteristics and strong adaptability to the external environment. The driving scenes of mobile equipment are complex and changeable during driving. However, because the field of view of a LiDAR is fixed, certain desired detection areas may fall into the blind spots of the LiDAR in some driving scenes. Therefore, it is necessary to improve the structure of LiDAR so that the detection range of LiDAR can be changed to cope with complex and changeable driving scenes.

Setting the LiDAR field of view range to be variable and selecting the corresponding field of view range based on the usage scenario can effectively reduce the scanning blind area of the LiDAR. A solution for LiDAR to achieve variable field of view range is mainly a cluster solution of multiple LiDARs, such as a system is formed by using LiDARs with different detection field of view ranges, and some of the LiDARs in the multiple LiDARs are adaptively combined and matched according to different scenarios to meet the needs of intelligent driving in the current scenario of the mobile device, such as long/short distance switching, resolution adjustment of the area of interest, blind spot detection, etc. This solution can effectively reduce the blind area range of the desired detection area during the driving of the mobile device, improve the obstacle detection capability and efficiency, and the system can provide higher fault tolerance and reliability. However, this solution requires the simultaneous deployment of multiple LiDARs with different detection field of view ranges on the mobile device, which has difficulties such as difficulty in deploying multiple LiDARs (such as position layout, wiring harness layout, etc., in the mobile device), high cost, high R&D investment cost, and long development cycle. A solution in this way is: a solution of using multiple MEMS LiDARs in conjunction with multiple blind LiDARs to achieve 360° all-round coverage of the entire vehicle.

An embodiment of the present application provides a LiDAR and a movable device, which improve the structure of the LiDAR to improve the situation where the LiDAR is difficult to cope with complex and changeable driving scenes as the field of view remains unchanged.

Figure 1:
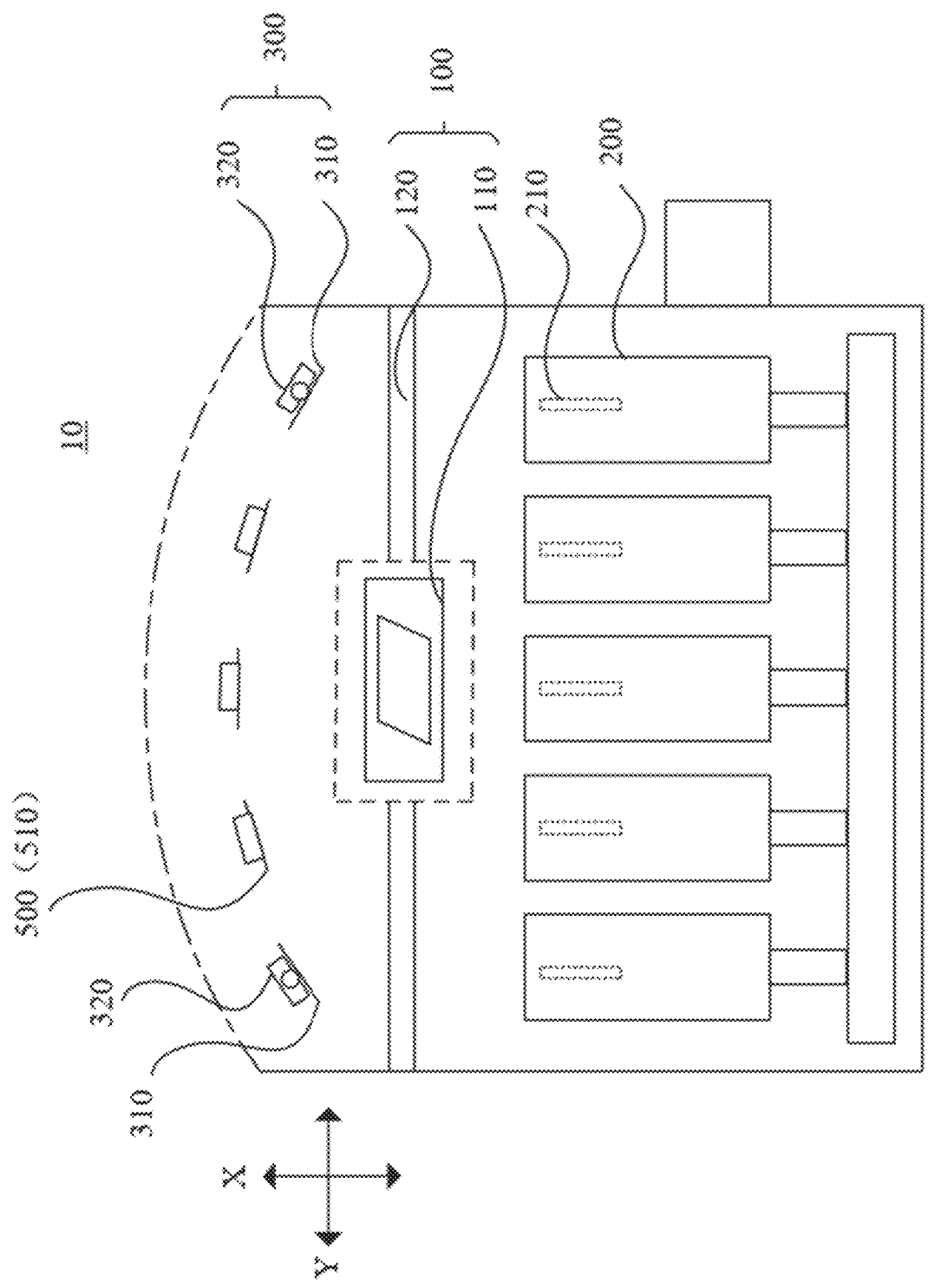
FIG. 1 is a schematic diagram of the structure of a LiDAR according to an embodiment of the present application.

FIG. 1 is a schematic diagram of the structure of a LiDAR 10 according to an embodiment of the present application. The LiDAR 10 includes a first optical transceiving module 200, a first reflecting module 300, and a galvanometer module 100. The first optical transceiving module 200 is configured to emit detection light and to receive echo light formed by a target object reflecting the detection light. The first reflecting module 300 includes a first reflecting mirror 310 corresponding to the first optical transceiving module 200, and the first reflecting mirror 310 is configured to reflect the detection light emitted by the first optical transceiving module 200 to the galvanometer module 100. The galvanometer module 100 includes a galvanometer 110, which is configured to receive the detection light reflected by the first reflecting mirror 310, and deflect the detection light and project it to the target object. The galvanometer 110 is configured to receive the echo light formed by the target object reflecting the detection light, and deflect the echo light and project it to the first reflecting mirror 310, and then reflect it from the first reflecting mirror 310 and project it to the corresponding first optical transceiving module 200. The galvanometer module 100 includes a first driving mechanism 120, which is connected to the galvanometer 110, and is configured to drive the galvanometer 110 to move between a first preset position and a second preset position. The first optical transceiving module 200 and the first reflecting module 300 are configured such that when the galvanometer 110 is located at the first preset position and the second preset position, the detection light emitted by the first optical transceiving module 200 can be reflected to the galvanometer 110 via the first reflecting mirror 310, and the incident angles to the galvanometer 110 located at the first preset position and the galvanometer 110 located at the second preset position are different.

One of the first preset position and the second preset position is the initial position of the galvanometer 110. The galvanometer 110 has a better effective scanning field of view and a better detection resolution at the initial position. The overall detection effect of the LiDAR 10 is good. When the LiDAR 10 is applied to the movable device 20, the galvanometer 110 is mainly in the initial position; when the movable device 20 drives to a special scene such as a blind spot or a large viewing angle, and a field of view of the LiDAR needs to be adjusted, the galvanometer 110 located at the initial position is moved, thereby changing the effective scanning field of view of the first optical transceiving module 200. In some embodiments, the first preset position is used as the initial position of the galvanometer 110, where the first driving mechanism 120 can drive the galvanometer 110 to move in one or more directions, and the second preset position is a position outside the first preset position where the galvanometer 110 is located. Each time the galvanometer 110 is moved to the second preset position to change the effective scanning field of view, and after the detection is completed, the galvanometer 110 is moved to the initial position. In an embodiment, the movement mode of the galvanometer 110 is described by way of example with the first preset position being used as the initial position of the galvanometer 110.

Taking the LiDAR 10 including two first optical transceiving modules 200 and two first reflecting modules 300 as an example, the first optical transceiving modules 200, the first reflecting module 300, and the galvanometer module 100 are described in turn. A direction determined by an end of the LiDAR 10 emitting detection light and an end of the LiDAR 10 away from the emitted detection light is defined as the front-to-back direction X of the LiDAR, and a direction parallel to the bottom surface of the LiDAR 10 and perpendicular to the front-to-back direction is defined as the left-right direction Y of the LiDAR. When the LiDAR 10 is applied to a movable device such as an automobile, the front-to-back direction generally corresponds to the moving direction of the movable device, and the left-right direction generally corresponds to the direction parallel to the ground and perpendicular to the moving direction.

For the first optical transceiving module 200, refer to FIG. 1. The first optical transceiving module 200 includes a first laser 210 and a first receiver. The first laser 210 is configured to emit a detection light, so that the detection light is sequentially emitted to the outside of the LiDAR 10 through the corresponding first reflecting module 300 and the galvanometer module 100, to detect a target object. The first receiver is configured to receive the echo light formed by the reflection of the detection light by the target object; the echo light enters the LiDAR 10 after being reflected from the target object, and sequentially passes through the galvanometer module 100 and the first reflecting module 300 to the first optical transceiving module 200, and is received by the first receiver. Along the left-right direction Y of the LiDAR, the two first optical transceiving modules 200 are arranged at intervals and are respectively arranged on both sides of the above-mentioned galvanometer module 100.

For the first reflecting module 300, refer to FIG. 1. The first reflecting module 300 is configured corresponding to the first optical transceiving module 200, and one first reflecting module 300 corresponds to one first optical transceiving module 200. Along the front-to-back direction X of the LiDAR, the first reflecting module 300 and the corresponding first optical transceiving module 200 are respectively located on both sides of the galvanometer module 100; along the front-to-back direction X, the first optical transceiving module 200 is located on the side of the galvanometer module 100 away from the light-emitting end of the LiDAR 10, and the first reflecting module 300 is located on the side of the galvanometer module 100 facing the light-emitting end of the LiDAR 10. The first reflecting module 300 includes a first reflecting mirror 310, which is configured to reflect the detection light emitted by the first optical transceiving module 200, so that the detection light is emitted toward the galvanometer module 100, and is deflected by the galvanometer module 100 to be emitted outside the LiDAR 10. Along the left-right direction Y of the LiDAR 10, the two first reflecting modules 300 are respectively disposed on both sides of the galvanometer module 100.

For the galvanometer module 100, refer to FIG. 1, which includes a galvanometer 110 and a first driving mechanism 120. The galvanometer 110 is a scanning module in the LiDAR 10, which includes a galvanometer mirror and a mirror driving mechanism. The galvanometer mirror is configured to receive the detection light reflected by the first reflecting mirror 310 and reflect it; the mirror driving mechanism is configured to drive the galvanometer mirror to swing, so as to change the exit angle of the detection light reflected by the galvanometer mirror, and then form a detection field of view outside the LiDAR 10. In an embodiment, the galvanometer 110 is a two-dimensional galvanometer. The mirror driving mechanism is configured to drive the galvanometer mirror to rotate around a horizontal first axis and around a second axis perpendicular to the first axis, so that the LiDAR 10 can realize horizontal and vertical scanning. In the process of the galvanometer mirror rotating around the first axis, the second axis rotate around the first axis; the galvanometer mirror also rotates around the second axis, so the galvanometer mirror can realize rotation in two directions. In some embodiments, the galvanometer 110 may be a one-dimensional galvanometer. Since the LiDAR 10 includes multiple first optical transceiving modules 200, the detection light emitted by each first optical transceiving module 200 will form a sub-detection field of view in front of the LiDAR 10, and the detection field of view of the LiDAR 10 is the union of each sub-detection field of view.

The first driving mechanism 120 is connected to the galvanometer 110, and is configured to drive the galvanometer 110 to move between the first preset position and the second preset position to change the physical position of the galvanometer 110. The first optical transceiving module 200 and the first reflecting module 300 are configured so that when the galvanometer 110 is located at the first preset position or the second preset position, the detection light emitted by the first optical transceiving module 200 can be reflected to the galvanometer 110 via the first reflecting mirror 310. Due to the change in the position of the galvanometer 110, the incident angle of the detection light reflected by the first reflecting mirror 310 to the galvanometer 110 will change compared with the previous position; the incident angle of the detection light emitted by the first optical transceiving module 200 to the galvanometer 110 located at the first preset position is different from that of the galvanometer 110 located at the second preset position. Therefore, when the rotation angle of the galvanometer 110 remains unchanged, the size of the sub-detection field of view corresponding to the first optical transceiving module 200 will remain unchanged, but the boundary of the sub-detection field of view will change, the boundary of the total detection field of view of the LiDAR will change.

When the galvanometer 110 is located at the first preset position or the second preset position, the detection light emitted by the first optical transceiving module 200 can be reflected to the galvanometer 110 via the first reflecting mirror 310.

In some embodiments, the first reflecting module 300 further includes a second driving mechanism 320. The second driving mechanism 320 is connected to the first reflecting mirror 310, and is configured to drive the first reflecting mirror 310 to rotate between a first angle position and a second angle position. In the first angle position, the first reflecting mirror 310 is configured to reflect the detection light to the galvanometer 110 located at the first preset position, and in the second angle position, the first reflecting mirror 310 is configured to reflect the detection light to the galvanometer 110 located at the second preset position. In an embodiment, the angle position of the first reflecting mirror 310 can be changed to adjust the emission angle of the detection light reflected by the first reflecting mirror 310, so that the detection light can fall on the galvanometer 110 after the position is changed, ensuring better light transmission efficiency, and on the other hand, the incident angle of the detection light when it is incident on the galvanometer 110 is changed to achieve the above-mentioned effect of changing the boundary of the total detection field of view of the LiDAR 10.

Figure 2:
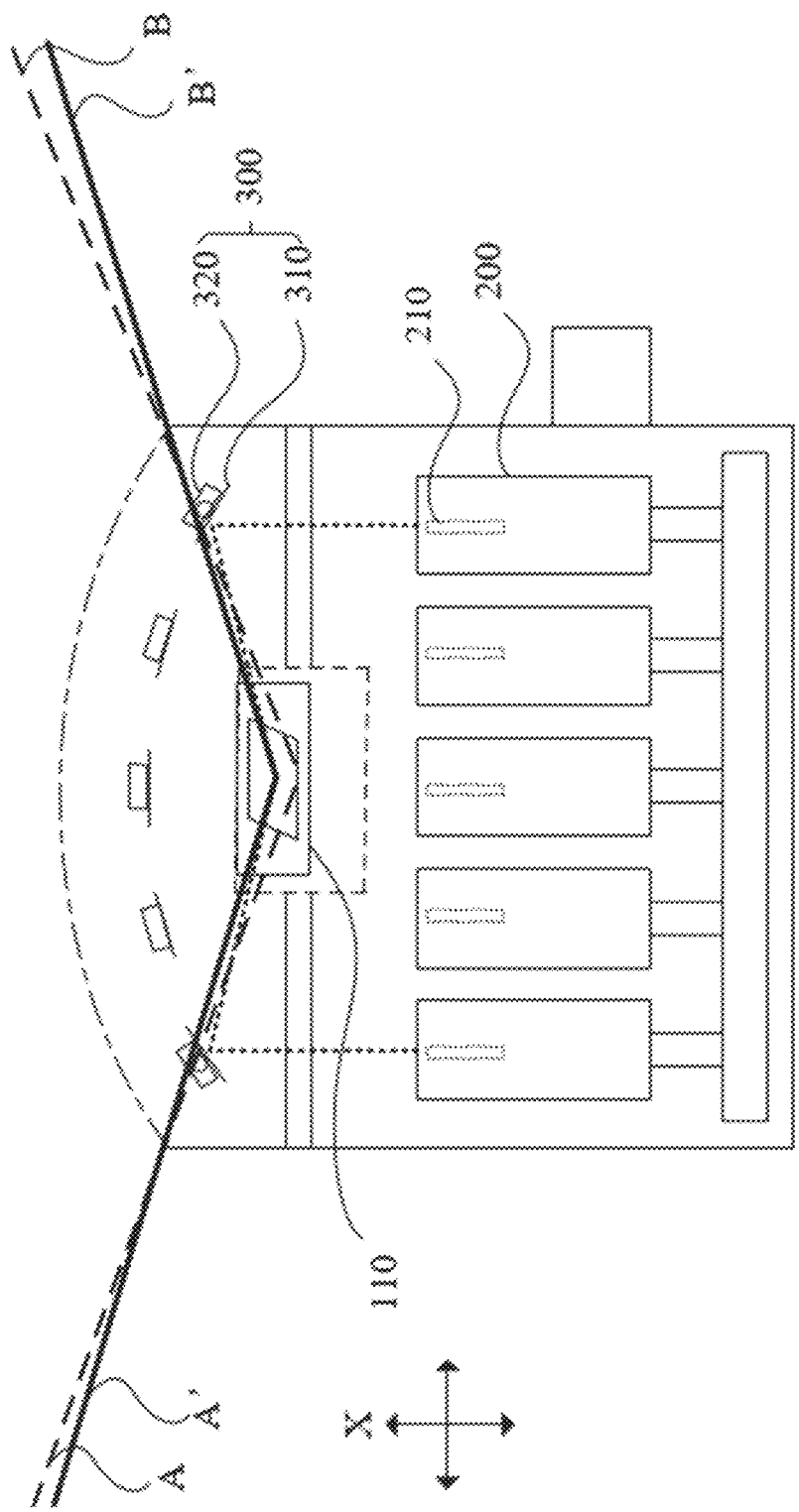
FIG. 2 is a schematic diagram of the structure of the galvanometer moving forward according to an embodiment of the present application.

In conjunction with FIG. 2, in some embodiments, the first driving mechanism 120 is configured to drive the galvanometer 110 to move between a first preset position (FIG. 1) and a second preset position (FIG. 2) along the front-rear direction X of the LiDAR 10. When the galvanometer 110 is located at the first preset position (refer to FIG. 1), its detection field of view is the area between A-B shown in the figure. When the first driving mechanism 120 drives the galvanometer 110 to move forward from the first preset position to the second preset position in the front-to-back direction X of the LiDAR 10; in the first reflecting module 300 on the right side shown in FIG. 2, the second driving mechanism 320 drives the first reflecting mirror 310 to rotate clockwise from the first angle position to the second angle position, and the incident angle of the detection light incident on the galvanometer 110 through the first reflecting mirror 310 will increase, and the corresponding detection field of view (located on the left side of the total detection field of view) will be deflected to the left; similarly, in the first reflecting module 300 on the left side shown in FIG. 2, the second driving mechanism 320 drives the first reflecting mirror 310 to rotate counterclockwise from the first angle position to the second angle position, and the incident angle of the detection light incident on the galvanometer 110 through the first reflecting mirror 310 will increase, and the corresponding detection field of view (located on the right side of the total detection field of view) will be deflected to the right. In this way, the detection field of view of the LiDAR 10 is changed from the area between A-B shown in the figure to the area between A'-B' shown in the figure, a size of the detection field of view is expanded as a whole, and the boundary of the detection field of view is expanded outward. When the detection field of view is increased in this way, any two adjacent sub-detection fields of view can still be seamlessly spliced within the expected detection distance range to avoid gaps between adjacent sub-detection fields of view.

Structure that can drive the galvanometer 110 to move at the first preset position and the second preset position is applicable, and structure that can drive the first reflecting mirror 310 to move at the first angle position and the second angle position is applicable. Exemplarily, the first driving mechanism 120 includes a first driving motor, a first screw rod, and a first slider; the galvanometer 110 is installed on the first slider, the first slider is threadedly connected to the first screw rod, and the first screw rod is connected to the driving shaft of the first driving motor. In this way, the first driving motor can drive the first screw rod to rotate, and then drive the slider to slide, so that the galvanometer 110 moves along a straight line between the first preset position and the second preset position. Exemplarily, the second driving mechanism includes a second driving motor and a gear assembly, and a plurality of gears of the gear assembly are meshed with each other, one of the gears is connected to the output shaft of the third driving motor, and the other gear is connected to the first reflecting mirror 310, so as to drive the first reflecting mirror 310 to switch back and forth between the first angle position and the second angle position.

In some embodiments, the second preset position can be set behind the first preset position. Embodiments of the present application reduce the total detection field of view of the LiDAR 10, and a clearer image of the target object can be obtained to meet the use requirements of high imaging effects.

Figure 3:
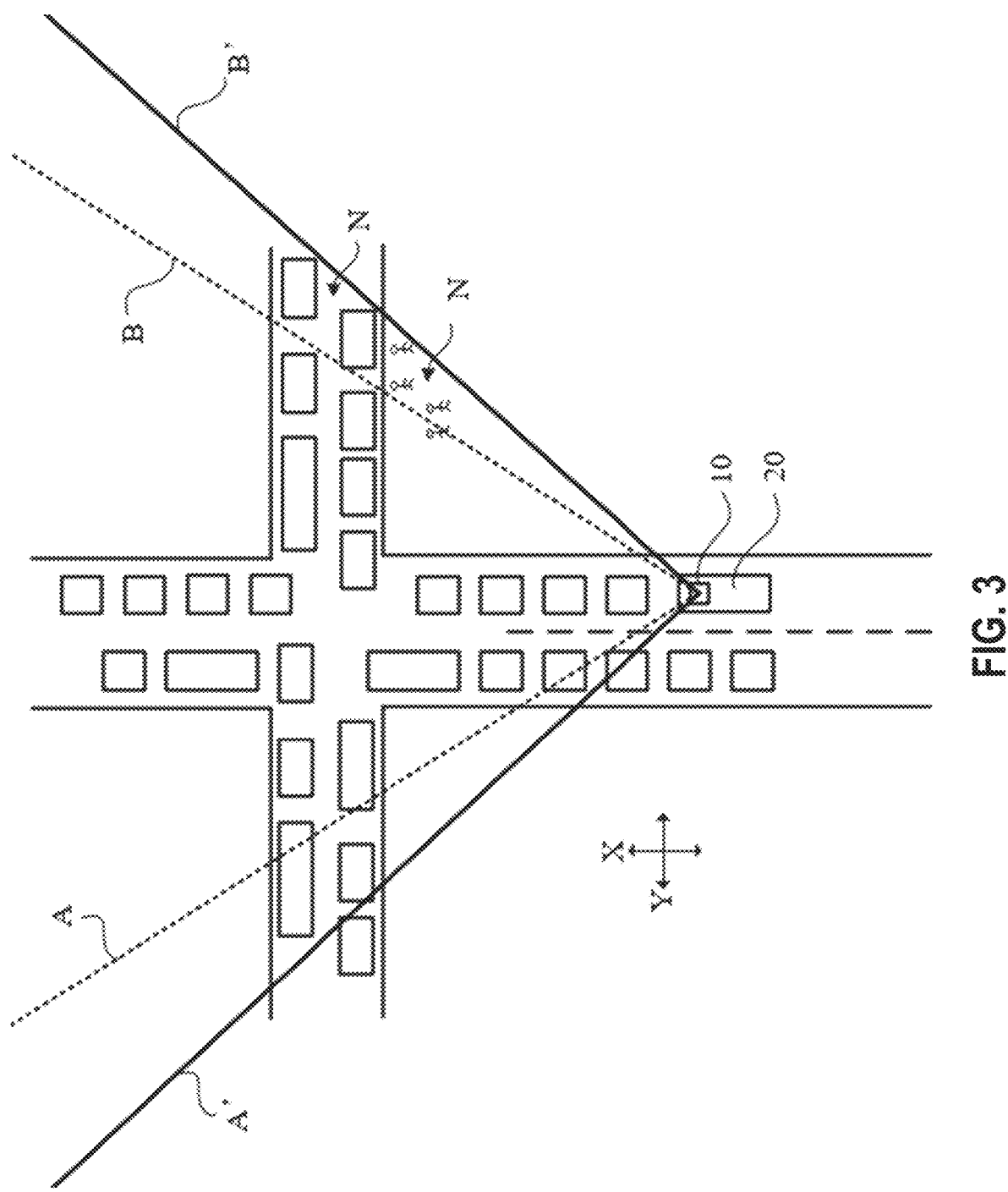
FIG. 3 is a schematic diagram of a movable device traveling toward a cross section according to an embodiment of the present application.

FIG. 3 shows an application scenario of the above embodiment. Taking the movable device 20 as a car as an example, when the car is driving on one of the straight sections of the cross section, the galvanometer 110 of the LiDAR 10 is in a first preset position, and the effective scanning field of view of the LiDAR 10 is the area between the light beam A and the light beam B. There is a target group N at the cross section, and some of the target group N are outside the area defined by the light beam A and the light beam B. If the galvanometer 110 is in the first preset position, the LiDAR 10 fails to detect the existence of all the target groups N, and when the car continues to approach the crossroad, the LiDAR 10 fails to detect the existence of all the target groups N, and it is easy for the car to be too close to the target group N and it is difficult to control the driving state of the car. With the LiDAR 10 of an embodiment, the first driving mechanism 120 can drive the galvanometer 110 to move forward from the first preset position to the second preset position, and the effective scanning field of view area of the LiDAR 10 becomes the area between the light A' and the light B'. The effective scanning field of view range between the light A' and the light B' is larger than the effective scanning field of view range between the light A and the light B, and more targets can be detected. The target group N can enter the area between the light A' and the light B' faster and more comprehensively, so that more time can be reserved for adjusting the driving state of the car. After the car leaves the scene, the first driving mechanism 120 can drive the galvanometer 110 to reset to the first preset position, and accordingly, the second driving mechanism 320 drives the first reflecting mirror 310 to reset to the first angle position.

Figure 4:
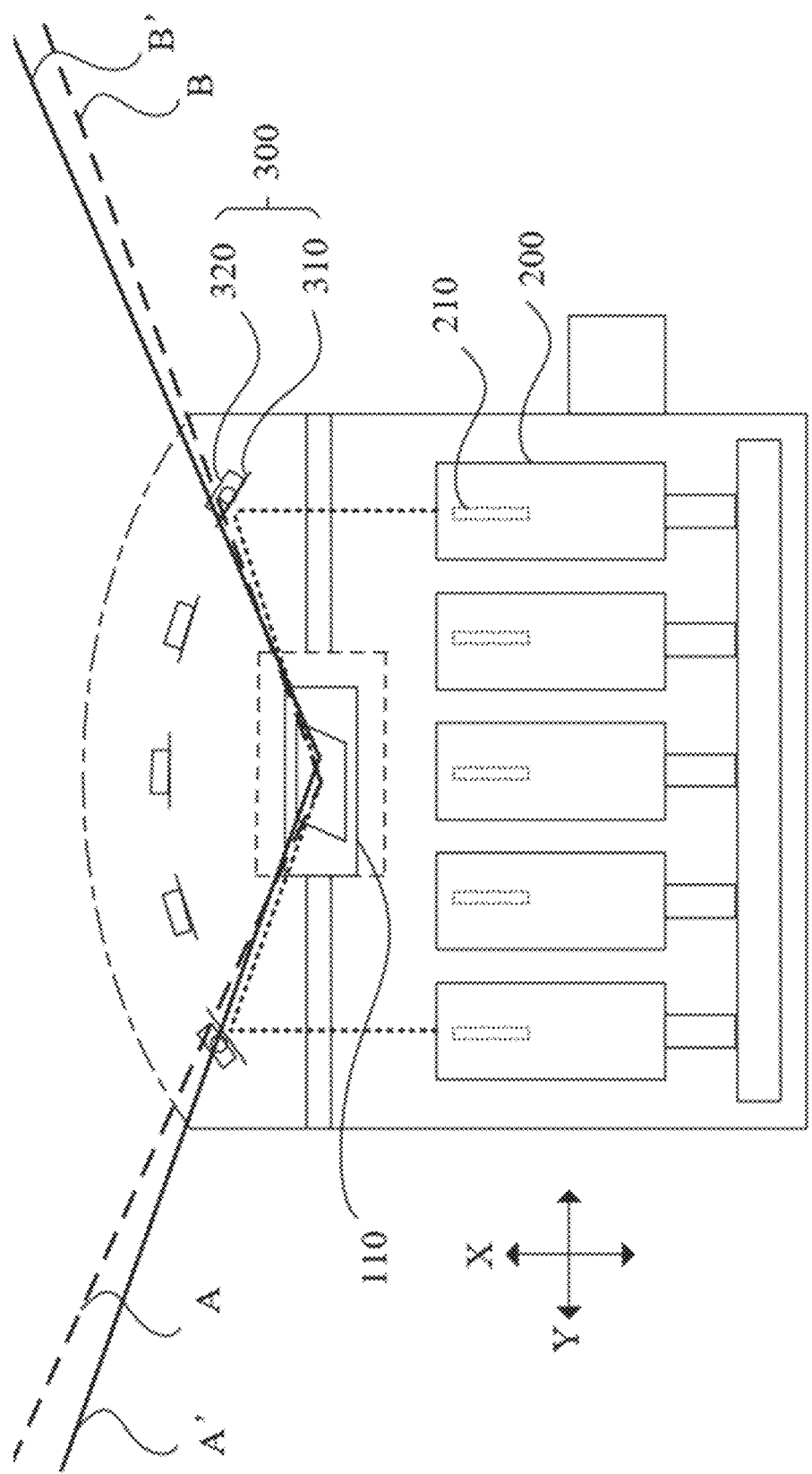
FIG. 4 is a schematic diagram of the structure of a galvanometer moving leftward according to an embodiment of the present application.

In conjunction with FIG. 4, in some embodiments, the first driving mechanism 120 is configured to drive the galvanometer 110 to move between the first preset position (FIG. 1) and the second preset position (FIG. 4) along the left-right direction Y of the LiDAR 10. When the galvanometer 110 is located at the first preset position (please refer to FIG. 1), its detection field of view is the area between A-B shown in the figure. When the first driving mechanism 120 drives the galvanometer 110 to move leftward from the first preset position to the second preset position in the left-right direction Y of the LiDAR 10; in the first reflecting module 300 on the right side shown in FIG. 4, the second driving mechanism 320 drives the first reflecting mirror 310 to rotate clockwise from the first angle position to the second angle position, and the incident angle of the detection light incident on the galvanometer 110 through the first reflecting mirror 310 will increase, and the corresponding detection field of view (located on the left side of the total detection field of view) will be deflected to the left as a whole; similarly, in the first reflecting module 300 on the left side shown in FIG. 4, the second driving mechanism 320 drives the first reflecting mirror 310 to rotate clockwise from the first angle position to the second angle position, and the incident angle of the detection light incident on the galvanometer 110 through the first reflecting mirror 310 will decrease, and the corresponding detection field of view (located on the right side of the total detection field of view) will be deflected to the left as a whole. The detection field of view of the LiDAR 10 is changed from the area between A-B shown in the figure to the area between A'-B' shown in the figure, and the detection field of view is rotated by a certain angle as a whole so as to be applied to the scene with higher requirements for position detection on the left side of the movable device.

In some embodiments, a second preset position can be set to the right of the first preset position; this method will cause the total detection field of view of the LiDAR 10 to rotate to the right as a whole, so as to be applied to scenarios with higher requirements for detecting the right side of the movable device.

Figure 5:
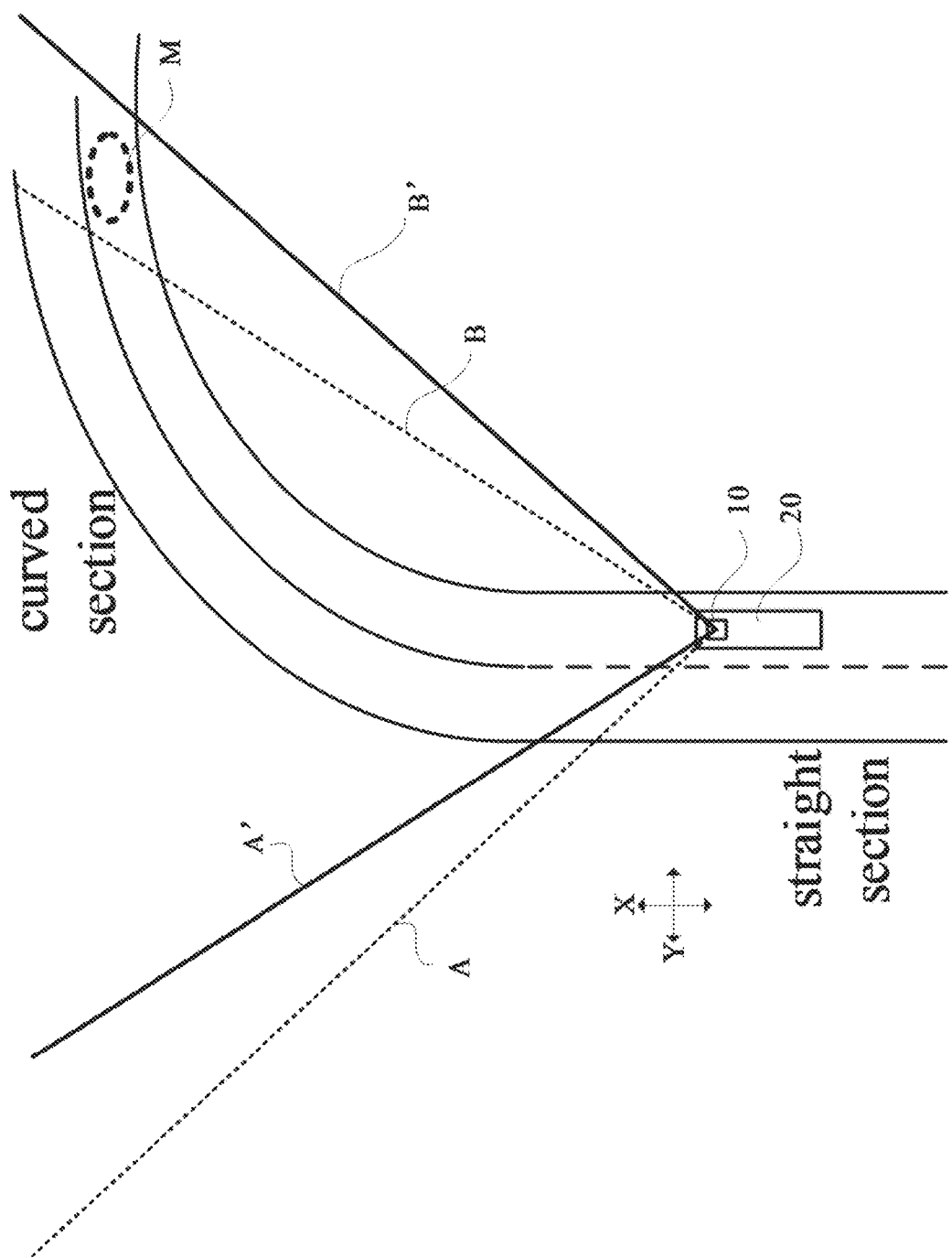
FIG. 5 is a schematic diagram of a movable device traveling toward a curved road section according to an embodiment of the present application.

FIG. 5 shows an application scenario of the above embodiment. Taking the movable device 20 as a car as an example, when the car is driving on a straight section, the galvanometer 110 of the LiDAR 10 is in the first preset position, and the effective scanning field of view of the LiDAR 10 is the area between the light beam A and the light beam B. There is a target M on the curved section, and the target M is outside the area defined by the light beam A and the light beam B. When the car is about to enter the curved section on the straight section, if the galvanometer 110 is in the first preset position, the LiDAR 10 cannot determine the existence of the target M on the straight section, even after entering the curved section for a period of time, and it is easy for the LiDAR 10 to enter the curved section and detect the target M, and the distance to the target M is too close to control the driving state of the car. Using the LiDAR 10 of an embodiment of the present application, the first driving mechanism 120 drives the galvanometer 110 to move rightward from the first preset position to the second preset position, and the effective scanning field of view of the LiDAR 10 becomes the area between the light A' and the light B', and the target M can enter the area between the light A' and the light B' more quickly, thereby reserving more time for adjusting the driving state of the car. After the car leaves the scene, the first driving mechanism 120 can drive the galvanometer 110 to reset to the first preset position, and accordingly, the second driving mechanism 320 drives the first reflecting mirror 310 to reset to the first angle position.

A relative position relationship between the first preset position and the second preset position is not single, and the two can be staggered in the front-to-back direction or in the left-to-right direction. In some embodiments, multiple second preset positions can be set. For example, one second preset position is staggered with the first preset position along the front-to-back direction of the LiDAR 10, and another second preset position is staggered with the first preset position along the left-to-right direction of the LiDAR 10. For another example, two second preset positions are staggered with the first preset position along the front-to-back direction of the LiDAR 10, one second preset position is located in front of the first preset position, and another second preset position is located behind the first preset position, and the two second preset positions are staggered with the first preset position along the left-to-right direction of the LiDAR 10, one second preset position is located to the left of the first preset position, and another second preset position is located to the right of the first preset position. Accordingly, the structure of the first drive mechanism 120 should be adaptively adjusted.

In an embodiment, the LiDAR 10 further includes at least one second optical transceiving module 400 and at least one second reflecting module 500. The second optical transceiving module 400 has substantially the same function as the first optical transceiving module 200. Along the left and right direction of the LiDAR 10, the second optical transceiving module 400 is disposed between the two first optical transceiving modules 200, and is configured to emit detection light and receive echo light formed by a target object reflecting the detection light. One second reflecting module 500 corresponds to one second optical transceiving module 400; along the front and back direction of the LiDAR 10, the second reflecting module 500 and the second optical transceiving module 400 are disposed on both sides of the galvanometer module 100, and along the left and right direction of the LiDAR 10, the second reflecting module 500 is located between the two first reflecting modules 300, and each first reflecting module and each second reflecting module are distributed in an arc shape around the galvanometer module. The second reflecting module 500 has substantially the same function as the first reflecting module 300. The second reflecting module 500 includes a second reflecting mirror 510 corresponding to the second optical transceiving module 400. The second reflecting mirror 510 is configured to reflect the detection light emitted by the second optical transceiving module 400 to the galvanometer module 100.

In an embodiment, the LiDAR 10 includes three second optical transceiving modules 400 and three second reflecting modules 500. The three second optical transceiving modules 400 are sequentially arranged between the two first optical transceiving modules 200, and the three second reflecting modules 500 and the two first reflecting modules 300 form an arc distribution together. In this way, the detection field of view formed by the two first optical transceiving modules 200 and the detection field of view formed by the second optical transceiving module 400 together form the detection field of view of the LiDAR 10. The detection field of view corresponding to the first optical transceiving module 200 on the left side shown in FIG. 1 is located at the far right of the figure; the detection field of view corresponding to the first optical transceiving module 200 on the right side is located at the far left of the figure; the detection fields of view corresponding to the three second optical transceiving modules 400 from left to right are arranged from right to left outside the LiDAR 10; and within the detection distance range, any two detection fields of view are seamlessly spliced to make the detection field of view a continuous field of view. In some embodiments, a quantity of the second optical transceiving module 400 and the second reflecting module 500 may be other numbers, such as one, two, five, etc. The LiDAR 10 may not include the second optical transceiving module 400 and the second reflecting module 500. In this case, the detection field of view of the LiDAR 10 is the union of the detection fields of view of the two first optical transceiving modules 200.

In an embodiment, at least one second optical transceiving module 400 and the corresponding second reflecting module 500 are configured such that when the galvanometer 110 is at the first preset position or the second preset position, the detection light emitted by the second optical transceiving module 400 can be reflected to the galvanometer via the second reflecting module 500. In this way, the detection field of view corresponding to the second optical transceiving module 400 will change with the change of the position of the galvanometer 110, which is conducive to making the two adjacent detection fields not completely staggered, thereby avoiding the formation of a detection blind spot. In the at least one second optical transceiving module 400, each second optical transceiving module 400 and the corresponding second reflecting module 500 can meet the above conditions, or some of the second optical transceiving modules 400 and the corresponding second reflecting modules 500 can meet the above conditions.

Figure 6:
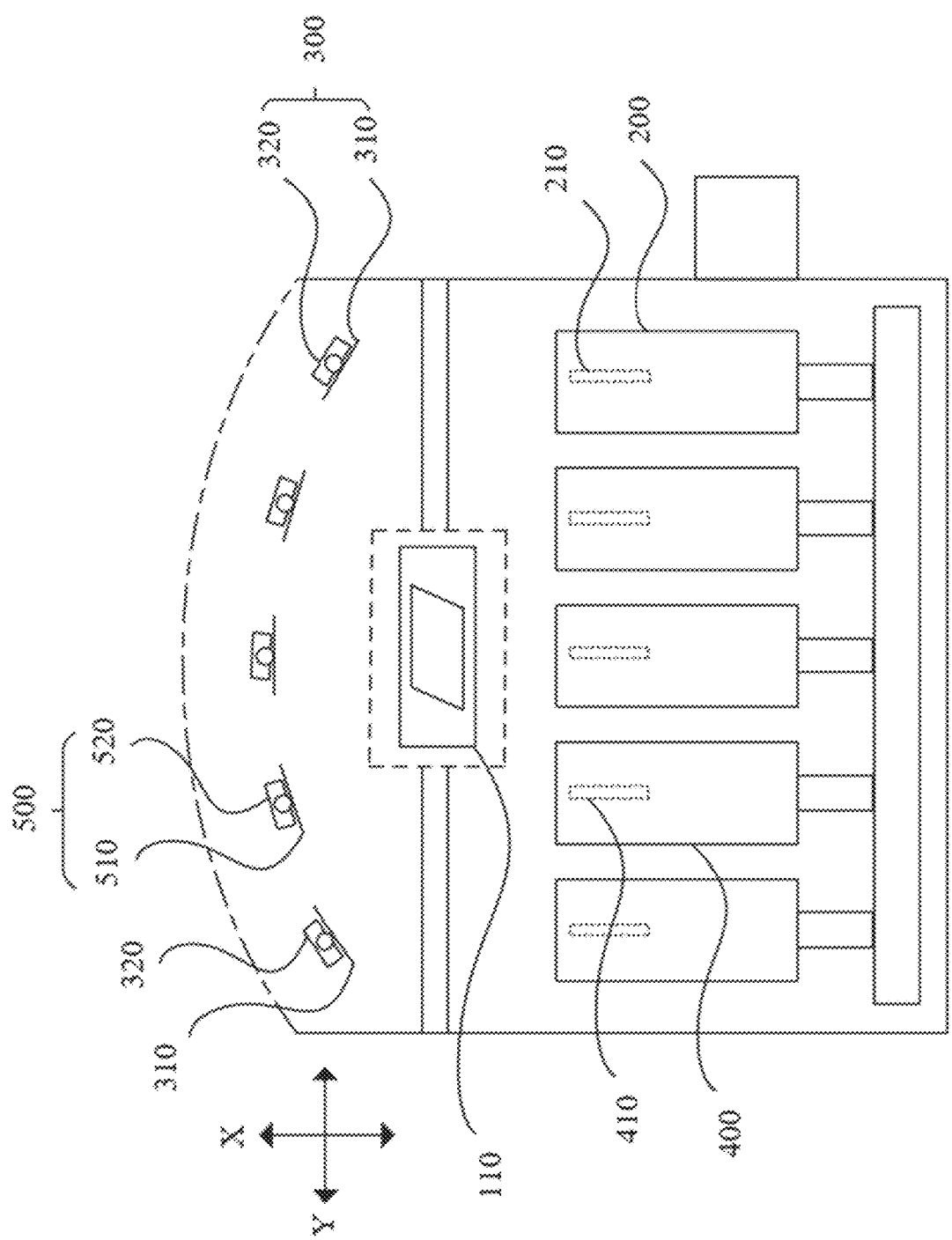
FIG. 6 is a schematic structural diagram of a second reflecting module having a third driving mechanism according to an embodiment of the present application.

The structure of the second optical transceiving module 400 and the second reflecting module 500, reference can be made to the first optical transceiving module 200 and the first reflecting module 300. As shown in FIG. 6, the second optical transceiving module 400 includes a third laser 410 and a second receiver. The third laser 410 is configured to emit detection light, and the second receiver is configured to receive echo light. At least part of the second reflecting module 500 includes a third driving mechanism 520. The third driving mechanism 520 is connected to the second reflecting mirror 510, and the third driving mechanism 520 is configured to drive the second reflecting mirror 510 to move at a third angle position and a fourth angle position, so as to drive the second reflecting mirror 510 to follow the movement of the galvanometer 110 and change its posture. At the third angle position, the second reflecting mirror 510 is configured to reflect the detection light to the galvanometer 110 located at the first preset position; at the fourth angle position, the second reflecting mirror 510 is configured to reflect the detection light to the galvanometer 110 located at the second preset position. For example, all the second reflecting modules 500 may include the third driving mechanism 520, or a portion of the second reflecting modules 500 may include the third driving mechanism 520, while the angle position of the second reflecting mirror 510 of the other portion of the second reflecting modules 500 may not change.

In an embodiment, the LiDAR 10 includes a control module, which is connected to the first driving mechanism 120 in communication, and the control module is configured to control the first driving mechanism 120 to drive the galvanometer 110 to move. The control module is connected to the first optical transceiving module 200 in communication, so as to control the first optical transceiving module 200 to emit detection light. The control module is connected to the first reflecting module 300 in communication, so as to control the first reflecting mirror 310 to switch between the first angle position and the second angle position. In this way, when the control module controls the first driving mechanism 120 to switch the position of the galvanometer 110, it also controls the switching of the posture of the first reflecting mirror 310, so that the detection light emitted by the first optical transceiving module 200 can fall on the galvanometer 110 regardless of whether the galvanometer 110 is in the first preset position or the second preset position. Similarly, the control module is connected to the second optical transceiving module 400 for controlling the second optical transceiving module 400 to emit the detection light. In addition, the control module is connected to the second reflecting module 500 for controlling the second reflecting mirror 510 to switch between the third angle position and the fourth angle position. In this way, when the control module controls the first driving mechanism 120 to switch the position of the galvanometer 110, it controls the switching of the posture of the second reflecting mirror 510, so that the detection light emitted by the second optical transceiving module 400 can fall on the galvanometer 110 regardless of whether the galvanometer 110 is at the first preset position or the second preset position. In this way, when the galvanometer 110 moves from the first preset position to the second preset position, the boundary of the sub-detection field of view corresponding to the first optical transceiving module 200 on both sides changes, and the boundary of the sub-detection field of view corresponding to the second optical transceiving module 400 changes synchronously, which is conducive to avoiding the sub-detection field of view corresponding to the first optical transceiving module 200 and the adjacent sub-detection field of view from generating a gap that cannot be detected in the expected detection interval, thereby forming a detection blind spot in this area. The "communication connection" described in the embodiment of the present application includes wired signal connection and wireless signal connection.

In an embodiment, the LiDAR 10 includes a displacement sensor, which is configured to obtain the position of the galvanometer 110 moving in the front-back direction X or the left-right direction Y of the LiDAR 10, and generate a coordinate signal of the galvanometer 110. The displacement sensor is communicatively connected to the control module to transmit the coordinate signal of the galvanometer 110 to the control module, and the control module controls the positions of the galvanometer 110, the first reflecting mirror 310, and the second reflecting mirror 510 according to the coordinate signal of the galvanometer 110.

The LiDAR 10 provided in an embodiment of the present application includes a first optical transceiving module 200, a first reflecting module 300, and a galvanometer module 100. The galvanometer module 100 includes a galvanometer 110 and a first driving mechanism 120 for driving the galvanometer 110 to move between a first preset position and a second preset position. The first optical transceiving module 200 and the first reflecting module 300 are configured so that when the galvanometer 110 is located at the first preset position and the second preset position, the detection light emitted by the first optical transceiving module 200 can be reflected to the galvanometer 110 via the first reflecting mirror 310.

The LiDAR 10 provided in an embodiment can change the total detection field of view of the LiDAR 10 by controlling the position of the galvanometer 110, such as expanding the total detection field of view of the LiDAR 10 and rotating the total detection field of view of the LiDAR 10, thereby meeting more diverse driving scenarios. That is, the LiDAR 10 provided in the embodiment of the present application can improve the current situation that the LiDAR 10 is difficult to cope with complex and changeable driving scenarios because the field of view range remains unchanged.

In an embodiment, the LiDAR 10 is applied to a movable device 20, and it is possible to detect changes in the field of view without configuring multiple LiDAR 10. Therefore, it is possible to avoid the difficulties in deployment (such as position layout, wiring harness layout, etc., in the movable device 20), high cost, high R&D investment cost, and long development cycle when arranging multiple LiDAR 10.

As long as the first optical transceiving module 200 and the first reflecting module 300 are configured so that when the galvanometer 110 is located at the first preset position or the second preset position, the detection light emitted by the first optical transceiving module 200 can be reflected to the galvanometer 110 via the first reflecting mirror 310.

Figure 7:
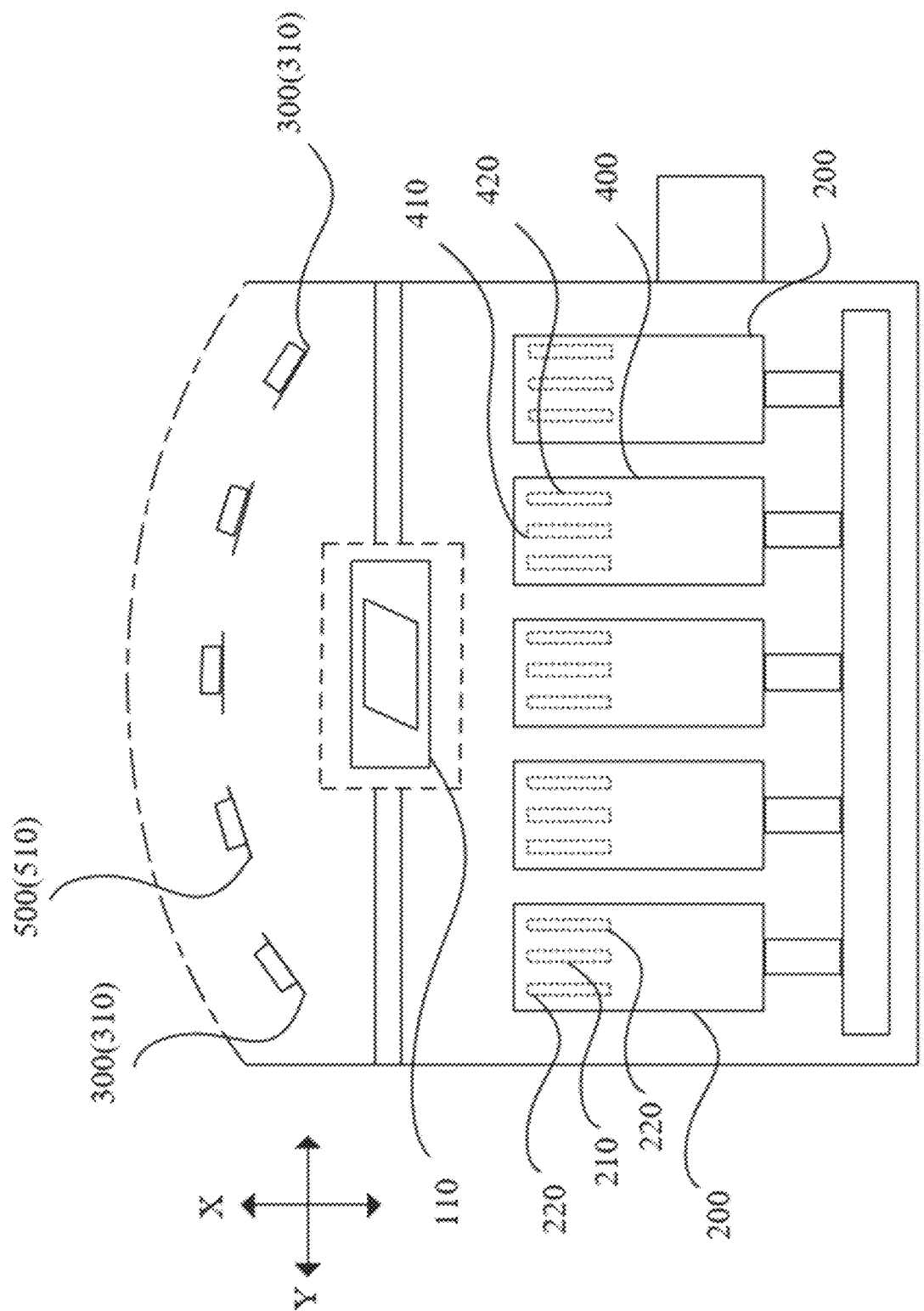
FIG. 7 is a schematic diagram of a structure in which a second optical transceiving module has a third laser and a fourth laser according to an embodiment of the present application.

FIG. 7 shows a schematic diagram of a LiDAR 10 provided in some embodiments.

In an embodiment, the first optical transceiving module 200 includes multiple lasers with different emission angles. The LiDAR 10 does not achieve the angle change of the detection light incident to the galvanometer 110 by rotating the first reflecting mirror 310, but achieves the angle change of the detection light incident to the galvanometer 110 by starting different lasers.

Refer to FIG. 7, each first optical transceiving module 200 includes a first laser 210 and a second laser 220, and the detection light emitted by the first laser 210 and the second laser 220 is set at a preset angle. The first laser 210 is configured to emit detection light when the galvanometer 110 is located at the first preset position, so that the detection light is reflected to the galvanometer 110 located at the first preset position via the first reflecting mirror 310; the second laser 220 is configured to emit detection light when the galvanometer 110 is located at the second preset position, so that the detection light is reflected to the galvanometer 110 located at the second preset position via the first reflecting mirror 310. The detection light emitted by the second laser 220 has a certain angle compared to the detection light emitted by the first laser 210, so that when the galvanometer 110 is at the second preset position, the detection light emitted by the second laser 220 can be reflected to the galvanometer 110 via the first reflecting mirror 310. In addition, each first optical transceiving module 200 includes a first receiver, which is configured to receive the echo light reflected by the first reflecting mirror 310, and the echo light includes the echo light formed after the detection light emitted by the first laser 210 and the second laser 220 is reflected by the target object.

In some embodiments, the galvanometer 110 includes a plurality of second preset positions. Accordingly, the first optical transceiving module 200 includes a plurality of second lasers 220, each of which corresponds to a second preset position of the galvanometer 110. The detection light emitted by each second laser 220 is arranged at an angle with the detection light emitted by the first laser 210, so that when the galvanometer 110 moves to each different second preset position, the corresponding second laser 220 is selected to emit the detection light, so that the detection light emitted by the first optical transceiving module 200 can be reflected to the galvanometer 110 via the first reflecting mirror 310.

Similarly, at least part of the second optical transceiving module 400 may include a third laser 410, a fourth laser 420, and a second receiver. The third laser 410 is configured to emit detection light when the galvanometer 110 is located at the first preset position, so that the detection light is reflected to the galvanometer 110 located at the first preset position via the second reflecting mirror 510; and the fourth laser 420 is configured to emit detection light when the galvanometer 110 is located at the second preset position, so that the detection light is reflected to the galvanometer 110 located at the second preset position via the second reflecting mirror 510. The second receiver is configured to receive the echo light reflected by the second reflecting mirror 510, and the echo light includes the echo light formed after the detection light emitted by the third laser 410 and the fourth laser 420 is reflected by the target object. The detection light emitted by the third laser 410 and the fourth laser 420 is arranged at a preset angle, so that when the galvanometer 110 moves to each different second preset position. The corresponding fourth laser 420 is selected to emit the detection light, so that the detection light emitted by the second optical transceiving module 400 can be reflected to the galvanometer 110 via the second reflecting mirror 510. For example, all of the second optical transceiving modules 400 include the third laser 410, the fourth laser 420, and the second receiver; or, a part of the second optical transceiving modules 400 includes the third laser 410, the fourth laser 420, and the second receiver, and another part of the second optical transceiving modules 400 includes one third laser 410 and one second receiver.

On one hand, the control module is connected to the first driving mechanism 120 for controlling the first driving mechanism 120 to drive the galvanometer 110 to move; on the other hand, it is connected to the first optical transceiving module 200 for controlling the first laser 210 and the second laser 220 to start at the right time; on the other hand, it is connected to the second optical transceiving module 400 for controlling the third laser 410 and the fourth laser 420 to start at the right time, so that when the galvanometer 110 is located at the first preset position or the second preset position. The detection light emitted by the first optical transceiving module 200 can be reflected to the galvanometer 110 via the first reflecting mirror 310, and the detection light emitted by the second optical transceiving module 400 can be reflected to the galvanometer 110 via the second reflecting mirror 510.

LiDAR 10 provided in the embodiment of FIG. 7 can achieve that when the galvanometer 110 is located at the first preset position or the second preset position, the detection light emitted by the first optical transceiving module 200 can be incident on the galvanometer 110.

The LiDAR 10 can change the detection field of view of the LiDAR 10 by controlling the position of the galvanometer 110, such as expanding the total detection field of view of the LiDAR 10 and rotating the total detection field of view of the LiDAR 10, thereby meeting more diverse driving scenarios, which can improve the situation that the LiDAR 10 is difficult to cope with complex and changeable driving scenarios because the field of view range remains unchanged.

In an embodiment, LiDAR 10 is applied to a movable device 20, and it is possible to detect changes in the field of view without configuring multiple LiDAR 10. Therefore, it is possible to avoid the difficulties in deployment (such as position layout, wiring harness layout, etc., in the movable device 20), high cost, high R&D investment cost, and long development cycle when multiple LiDAR 10 are arranged.

LiDAR 10 realizes the change of the detection light path by setting the first laser 210 and the second laser 220, so there is no need to set up the second driving mechanism 320, which is conducive to simplifying the structure of the LiDAR 10.

Figure 8:
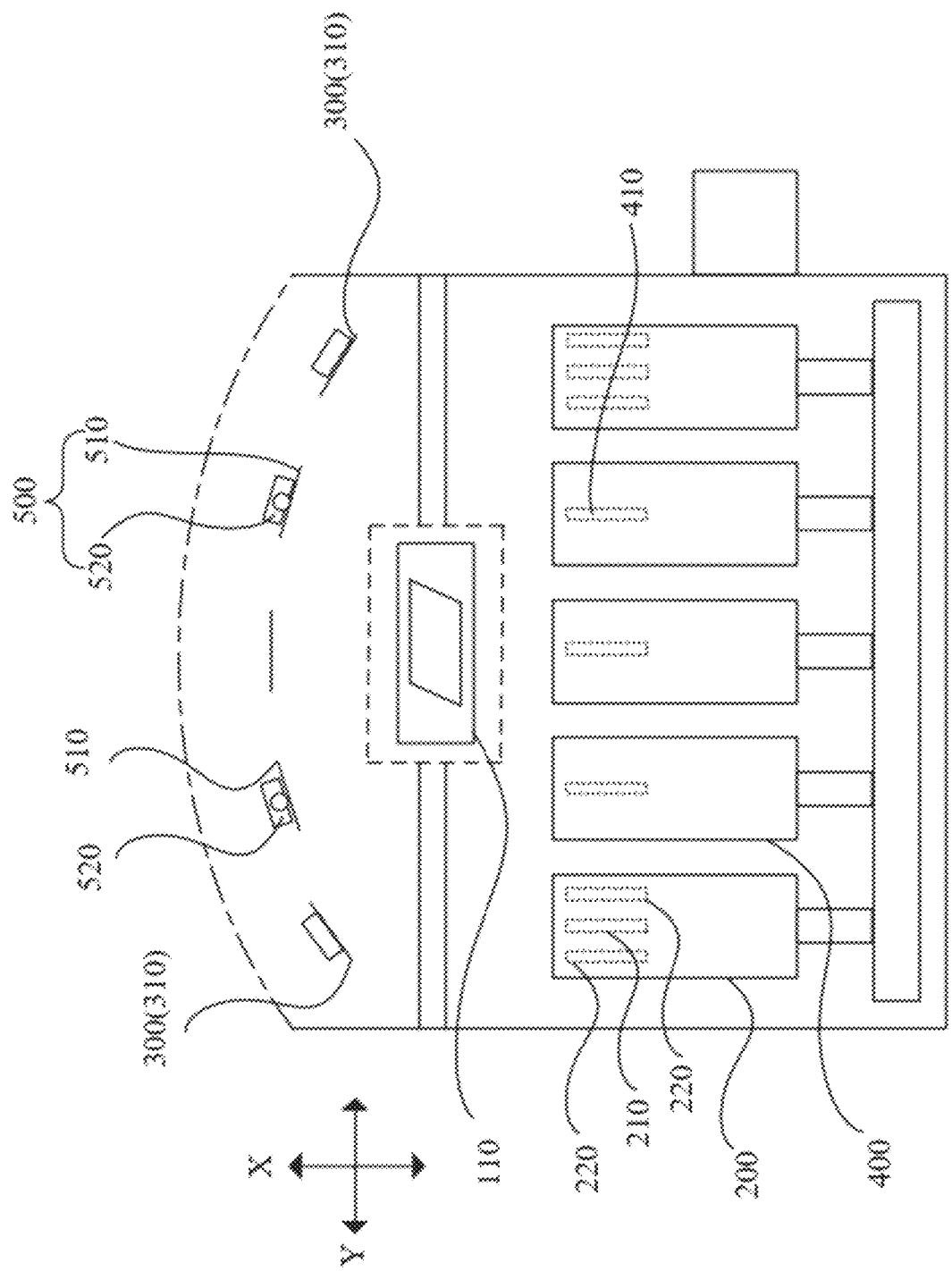
FIG. 8 is a schematic diagram of a structure of a first optical transceiving module and a second driving mechanism used in combination with a LiDAR according to an embodiment of the present application.

In some embodiments, a combination of the above two methods can be adopted. For example, referring to FIG. 8, a first optical transceiving module 200 including a first laser 210 and a second laser 220 and a first reflecting module 300 including a first reflecting mirror 310 can be set on two edges of the light receiving and transmitting paths. At the same time, at least one group of second optical transceiving modules 400 including a third laser 410 and a second receiver, and a second reflecting module 500 including a second reflecting mirror 510 and a third driving mechanism 520 can be set on the middle of the light receiving and transmitting paths. With such combination, the edge field of view range can be adjusted by switching the angle of the first optical transceiving module 200 located on the edge to transmit the detection light, and the middle field of view range can be adjusted by switching the angle of the second reflecting mirror 510 located in the middle.

Figure 9:
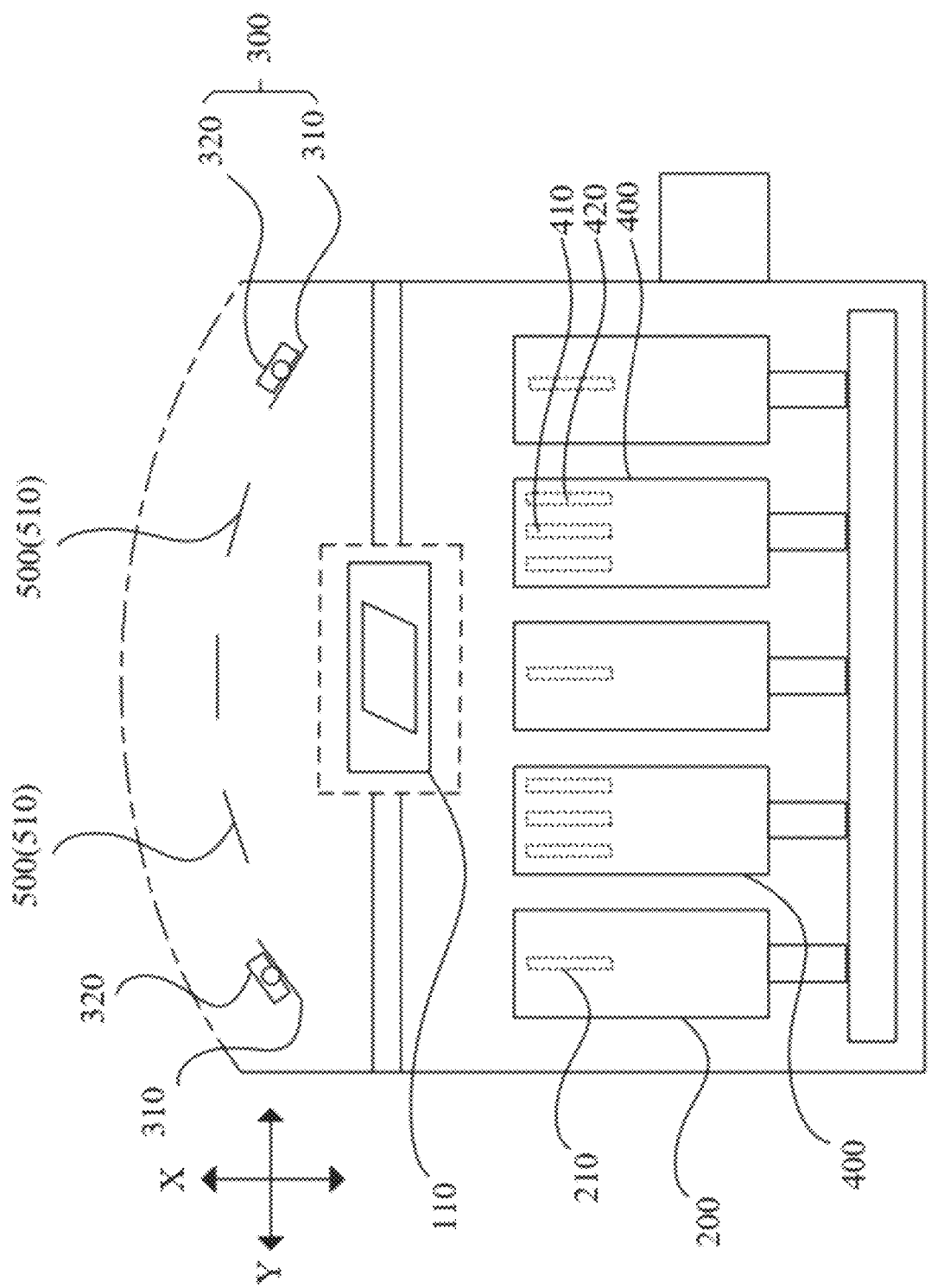
FIG. 9 is a schematic structural diagram of a first optical transceiving module and a second driving mechanism used in combination with a LiDAR according to another embodiment of the present application.

Refer to FIG. 9, in some embodiments, the first optical transceiving module 200 located on the two edges of the optical receiving and transmitting paths may include a first laser 210 and a first receiver, and the first reflecting module 300 may include a first reflecting mirror 310 and a second driving mechanism 320. At least one group of second optical transceiving modules 400 located in the middle may include a third laser 410 and a fourth laser 420, and the second reflecting module 500 may include a second reflecting mirror 510. With such a combination, the middle field of view may be adjusted by switching the angle of the first reflecting mirror 310 located at the edge, and the edge field of view may be adjusted by switching the angle of the detection light emitted by the second optical transceiving module 400 located in the middle.

Regarding the LiDAR 10, in an embodiment, a quantity of the first optical transceiving module 200 may be one, which can also realize the change of the detection field of view of the LiDAR 10, the rotation of the detection field of view of the LiDAR 10.

Figure 10:
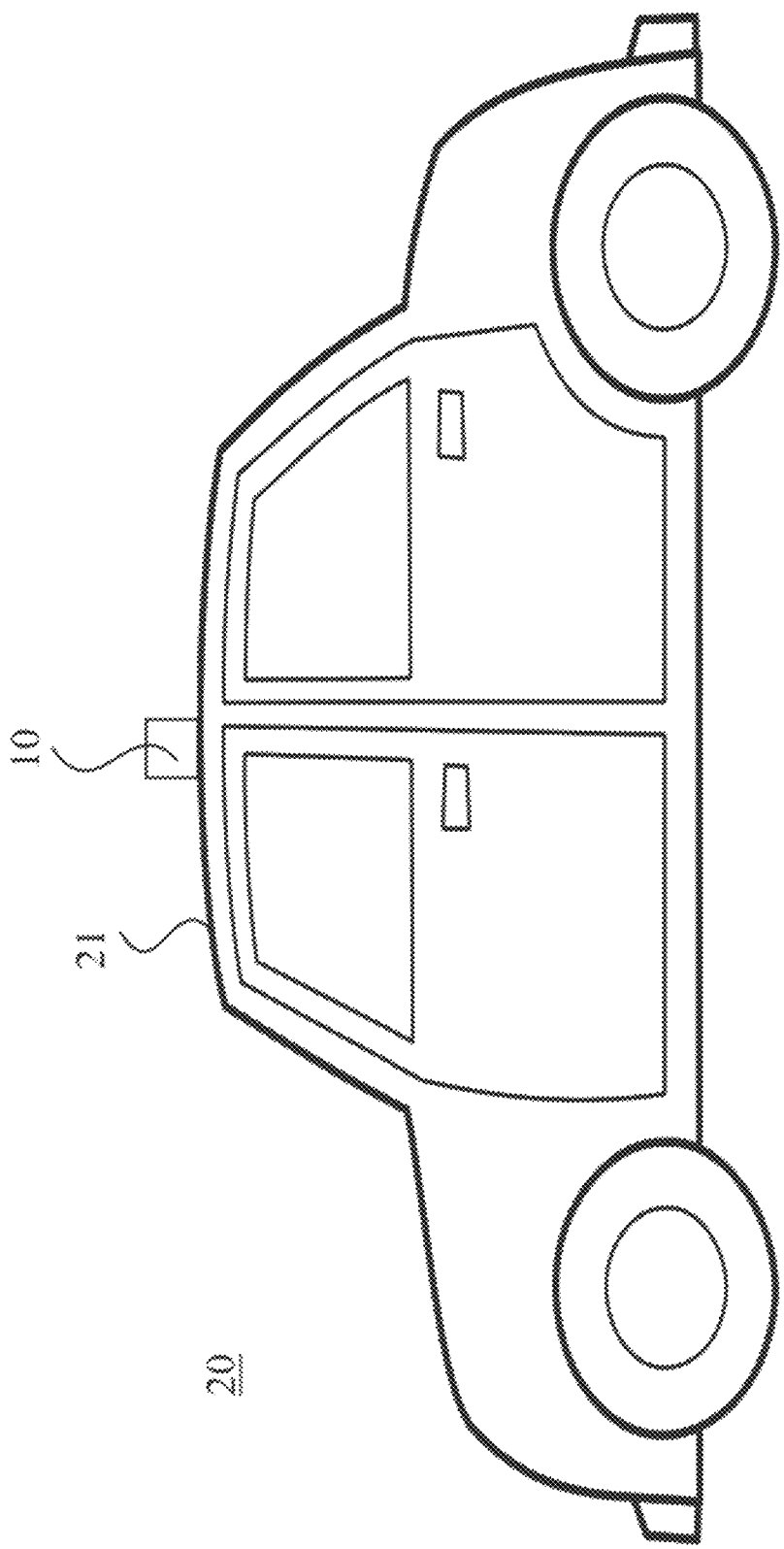
FIG. 10 is a schematic diagram of the structure of a LiDAR installed on a movable device according to an embodiment of the present application.

An embodiment of the present application provides a movable device 20. FIG. 10 is a schematic diagram of the movable device 20. The movable device 20 is a device that can be moved relative to the ground, and includes a movable main body and a LiDAR 10 mounted on the base.

In an embodiment, the movable device 20 is a car, where the main body 21 is the body of the car, and the LiDAR 10 is mounted on the body. In some embodiments, the movable device may be any mobile tool equipped with the LiDAR 10, such as an electric car, a drone, a robot, etc. For example, the movable device 20 includes a vehicle with six automatic driving technology levels of L0-L5 established by the Society of Automotive Engineers International (SAE International) or the Chinese national standard "Automotive Driving Automation Classification," for example, it may be a vehicle device or a robot device with the following various functions:

(1) Passenger-carrying function, such as family cars and buses;

(2) Cargo-carrying function, such as ordinary trucks, van trucks, trailer trucks, closed trucks, tank trucks, flatbed trucks, container trucks, dump trucks, trucks with special structures, etc.;

(3) Tool functions, such as logistics delivery vehicles, automated guided vehicles (AGVs), patrol cars, cranes, hoists, excavators, bulldozers, forklifts, road rollers, loaders, off-road engineering vehicles, armored engineering vehicles, sewage treatment vehicles, sanitation vehicles, vacuum trucks, floor scrubbers, water sprinklers, sweeping robots, food delivery robots, shopping guide robots, lawn mowers, golf carts, etc.;

(4) Entertainment functions, such as entertainment vehicles, amusement park self-driving devices, balance vehicles, etc.;

(5) Special rescue functions, such as fire trucks, ambulances, power repair vehicles, engineering rescue vehicles, etc.

The present application does not impose strict limitations on the type of the movable device 20 and will not list them all here.

The same or similar numbers in the drawings of this embodiment correspond to the same or similar parts. In the description, if the terms "upper," "lower," "left," "right," etc., indicate an orientation or positional relationship based on the orientation or positional relationship shown in the drawings, it is only for the convenience of describing this application and simplifying the description, rather than indicating or implying that the device or element referred to must have a specific orientation, be constructed and operated in a specific orientation. Therefore, the terms describing the positional relationship in the drawings are only used for illustrative purposes.

What is claimed is:

1. A LiDAR, comprising a first optical transceiving module, a first reflecting module, and a galvanometer module, wherein the first optical transceiving module is configured to emit a detection light;

wherein the first reflecting module comprises a first reflecting mirror arranged corresponding to the first optical transceiving module, along a front-to-back direction of the LiDAR, the first optical transceiving module and corresponding first reflecting module are respectively located on both sides of the galvanometer module, and the first reflecting mirror is configured to reflect the detection light emitted by the first optical transceiving module to the galvanometer module, wherein the front-to-back direction of the LiDAR is a direction determined by one end of the LiDAR emitting detection light and one end of the LiDAR away from the emitting detection light;

wherein the galvanometer module comprises a galvanometer and a first driving mechanism, the galvanometer comprises a galvanometer mirror and a mirror driving mechanism, the galvanometer mirror is configured to receive the detection light reflected by the first reflecting mirror and reflect it, the mirror driving mechanism is configured to drive the galvanometer mirror to swing, so as to change an exit angle of the detection light reflected by the galvanometer mirror, the first driving mechanism is connected to the galvanometer, and the first driving mechanism is configured to drive the galvanometer to move between a first preset position and a second preset position; and wherein the first optical transceiving module and the first reflecting module are configured so that when the galvanometer is located at the first preset position and the second preset position, the detection light emitted by the first optical transceiving module is reflected to the galvanometer via the first reflecting mirror, wherein the LiDAR meets at least one of the following conditions:

(1) wherein the first reflecting module comprises a second driving mechanism, the second driving mechanism is connected to the first reflecting mirror and is configured to drive the first reflecting mirror to rotate between a first angle position and a second angle position, at the first angle position, the first reflecting mirror is configured to reflect the detection light to the galvanometer located at the first preset position, and at the second angle position, the first reflecting mirror is configured to reflect the detection light to the galvanometer located at the second preset position; or (2) wherein the first optical transceiving module comprises a first laser and a second laser, and a detection light emitted by the first laser and a detection light emitted by the second laser are arranged at a preset angle, the first laser is configured to emit detection light when the galvanometer is located at the first preset position, so that the detection light is reflected by the first reflecting mirror to the galvanometer located at the first preset position, and the second laser is configured to emit detection light when the galvanometer is located at the second preset position, so that the detection light is reflected by the first reflecting mirror to the galvanometer located at the second preset position.

2. The LiDAR according to claim 1, wherein the first driving mechanism is configured to drive the galvanometer to move between the first preset position and the second preset position along the front-to-back direction of the LiDAR.

3. The LiDAR according to claim 1, wherein the first driving mechanism is configured to drive the galvanometer to move between the first preset position and the second preset position along a left-right direction of the LiDAR, and wherein the left-right direction of the LiDAR is a direction parallel to a bottom surface of the LiDAR and perpendicular to the front-to-back direction.

4. The LiDAR according to claim 1, wherein the LiDAR comprises two first optical transceiving modules and two first reflecting modules, wherein, along a left-right direction of the LiDAR, the two first optical transceiving modules are respectively arranged on both sides of the galvanometer module, and the two first reflecting modules are respectively arranged on both sides of the galvanometer module, and wherein the left-right direction of the LiDAR is a direction parallel to a bottom surface of the LiDAR and perpendicular to the front-to-back direction.

5. The LiDAR according to claim 4, further comprising:

at least one second optical transceiving module, disposed between the two first optical transceiving modules, for emitting detection light and for receiving echo light formed by a target object reflecting the detection light; and at least one second reflecting module, wherein one second reflecting module corresponds to one second optical transceiving module, each second reflecting module comprises a second reflecting mirror corresponding to the second optical transceiving module, the second reflecting mirror is configured to reflect the detection light emitted by the second optical transceiving module to the galvanometer module, along the left-right direction of the LiDAR, each second reflecting module is located between the two first reflecting modules, and the first reflecting modules and the second reflecting module are distributed in an arc shape around the galvanometer module.

6. The LiDAR according to claim 5, wherein the LiDAR comprises three second optical transceiving modules and three second reflecting modules, and wherein at least one second optical transceiving module and corresponding second reflecting module are configured so that when the galvanometer is at the first preset position and the second preset position, the detection light emitted by the second optical transceiving module is reflected to the galvanometer via the second reflecting module.

7. The LiDAR according to claim 1, further comprising a control module, wherein the control module is in communication connection with the first driving mechanism, and the control module is configured to control the first driving mechanism to drive the galvanometer to move; and wherein at least one of the first optical transceiving module and the first reflecting module is communicatively connected to the control module.

8. A movable device, comprising a movable main body and a LiDAR mounted on the main body, wherein the LiDAR comprises a first optical transceiving module, a first reflecting module, and a galvanometer module, wherein the first optical transceiving module is configured to emit a detection light;

wherein the first reflecting module comprises a first reflecting mirror arranged corresponding to the first optical transceiving module, along a front-to-back direction of the LiDAR, the first optical transceiving module and corresponding first reflecting module are respectively located on both sides of the galvanometer module, and the first reflecting mirror is configured to reflect the detection light emitted by the first optical transceiving module to the galvanometer module, wherein the front-to-back direction of the LiDAR is a direction determined by one end of the LiDAR emitting detection light and one end of the LiDAR away from the emitting detection light;

wherein the galvanometer module comprises a galvanometer and a first driving mechanism, the galvanometer comprises a galvanometer mirror and a mirror driving mechanism, the galvanometer mirror is configured to receive the detection light reflected by the first reflecting mirror and reflect it; the mirror driving mechanism is configured to drive the galvanometer mirror to swing, so as to change an exit angle of the detection light reflected by the galvanometer mirror, the first driving mechanism is connected to the galvanometer, and the first driving mechanism is configured to drive the galvanometer to move between a first preset position and a second preset position; and wherein the first optical transceiving module and the first reflecting module are configured so that when the galvanometer is located at the first preset position and the second preset position, the detection light emitted by the first optical transceiving module is reflected to the galvanometer via the first reflecting mirror, wherein the LiDAR meets at least one of the following conditions:

(1) wherein the first reflecting module comprises a second driving mechanism, the second driving mechanism is connected to the first reflecting mirror and is configured to drive the first reflecting mirror to rotate between a first angle position and a second angle position, at the first angle position, the first reflecting mirror is configured to reflect the detection light to the galvanometer located at the first preset position, and at the second angle position, the first reflecting mirror is configured to reflect the detection light to the galvanometer located at the second preset position; or (2) wherein the first optical transceiving module comprises a first laser and a second laser, and a detection light emitted by the first laser and a detection light emitted by the second laser are arranged at a preset angle, the first laser is configured to emit detection light when the galvanometer is located at the first preset position, so that the detection light is reflected by the first reflecting mirror to the galvanometer located at the first preset position, and the second laser is configured to emit detection light when the galvanometer is located at the second preset position, so that the detection light is reflected by the first reflecting mirror to the galvanometer located at the second preset position.

\* \* \* \* \*